3,053,892
METAPHOSPHORIC ACID COMPLEXES OF TETRACYCLINE AND ITS ANALOGS

George Madison Sieger, Jr., and Joseph Francis Weidenheimer, Pearl River, N.Y., assignors to American Cyanamid Company, New York, N.Y., a corporation of Maine
No Drawing. Filed Apr. 27, 1960, Ser. No. 24,870
9 Claims. (Cl. 260—559)

This invention relates to new and useful antibiotic products formed by the reaction of a tetracycline antibiotic with phosphoric acids under substantial anhydrous conditions. The invention includes the new tetracycline antibiotic acid complexes, the process by which they are prepared, and to preparations containing the same.

It is known that a number of phosphates, such as sodium metaphosphate, favorably affect the rate of absorption of orally administered tetracycline antibiotics whereby higher blood serum levels of the antibiotic are obtained in a shorter period of time and persist over a longer period. For instance, a mere mixture of equal parts by weight of tetracycline and sodium metaphosphate will, when ingested orally, give higher blood levels of tetracycline in a shorter time than when an equal quantity of tetracycline is ingested alone. These higher blood levels of tetracycline are maintained in the blood stream over a longer period of time. The reason for this is not known, but it is thought that it may be due to the sequestering action of the metaphosphate on certain metals which normally occur in the digestive tract which might otherwise interfere with tetracycline absorption.

It has also been found that simple salts of tetracycline and metaphosphoric acid which are formed in aqueous media also give improved blood levels of tetracycline when the product is taken orally. The reason for these improved blood levels is also not understood.

The tetracycline-sodium metaphosphate mixtures, although cheap and easy to compound, have the disadvantage that their use results in the administration of sodium to the patient; and, as is well known, some persons must avoid excessive amounts of sodium. The tetracycline-metaphosphoric acid compounds which are prepared by simple reaction of the two components under aqueous conditions have a very low water-solubility which limits their use for a number of important purposes. We have discovered, however, that new tetracycline-metaphosphoric acid complexes of extremely high water-solubility can be prepared by reacting a tetracycline antibiotic with freshly developed metaphosphoric acid under substantially anhydrous conditions and that this new product has all of the therapeutically desirable properties of the previously known mixtures and compounds and in addition is more physically stable and more soluble in a number of solvents including water which are used in the formulation of pharmaceutical products.

Whereas the tetracycline-metaphosphoric acid compounds which are prepared by simple mixing of the tetracycline hydrochloride and sodium metaphosphate (hexa) in aqueous solution are therapeutically effective, they have a water-solubility of less than 10 milligrams per milliliter. This water insolubility is an obvious disadvantage in the preparation of injectable preparations and in other pharmaceutically desirable products such as syrups, elixirs, pediatric drops, sprays, infusions, and the like. In contrast to the above, the new tetracycline-metaphosphoric acid addition compounds (complexes or salts) of the present invention may have a solubility from 500 milligrams to 1000 milligrams or more per milliliter in water. In addition, these solutions are physically and biologically stable for long periods of time, retaining their clear color and 75 percent or better of their antibiotic potency for more than one week at room temperature, being better in these respects than in tetracycline hydrochloride. These new products also form physically stable solutions in organic liquids, such as propylene glycol, polyethylene glycol, peanut oil, castor oil and other solvents which are often used in the preparation of pharmaceutical products. The exact manner in which the new products are formed and the reason for their greatly increased solubility over other tetracycline-metaphosphoric acid complexes is not known. Their outward appearance and physiological behavior seem to be alike. The outstanding differences in solubility, however, indicate a fundamental difference in structure. Infrared studies on the products of the present invention in comparison with the tetracyclines reveal differences in the 7.50 micron and 9.25 micron regions of the infrared spectrum, thus indicating possible involvement of the 6-hydroxy and 4-dimethylamino groups. Comparison of the products of the present invention with those described in United States Patent No. 2,791,609 reveal differences at 7.85 microns, thus indicating a different type of phosphate bonding. Also, the product of the present invention has a minimum at 9.25 microns whereas the products of United States Patent No. 2,791,609 have a maximum at this point of the infrared spectrum. Our products do not contain sodium.

In the specification and claims in the term "antibiotically active tetracycline" is included the tetracyclines which are antibiotics. It includes tetracycline itself, chlortetracycline, bromotetracycline, oxytetracycline and various other demethyl, deoxy, and demethyl deoxy tetracyclines and chlortetracyclines.

The preferred method of producing the new products of the present invention is to form metaphosphoric acid and react it with one of the tetracyclines under substantially anhydrous conditions as promptly as possible after the metaphosphoric acid is developed. A preferred method of forming fresh metaphosphoric acid is to place $P_2O_5$ in a reaction vessel and cover it with an inert anhydrous liquid such as chloroform and add thereto an equimolar quantity of water calculated to react with $P_2O_5$ to yield $HPO_3$. The tetracycline is then added to the freshly formed $HPO_3$ mixture so that the reaction may take place before $HPO_3$ has changed its essential character as by polymerization or by some other reaction.

The amount of metaphosphoric acid available for reaction with the antibiotically active tetracycline should be at least one equivalent for each equivalent of the tetracycline. However, it has been observed that higher molecular ratios of metaphosphoric acid result in products which have higher water solubility; and in a preferred embodiment, sufficient metaphosphoric acid is developed in the reaction mixture to provide about two equivalents of $HPO_3$ for each equivalent of tetracycline antibiotic. Larger amounts up to about four equivalents of metaphosphoric acid may be formed in the reaction mixture for reaction with the tetracycline. When using tetracycline as the antibiotic, these products would have the general formula $C_{22}H_{24}N_2O_8 \cdot (HPO_3)_n$ wherein $n$ is a small number ranging from 1 to about 4.

The development of the metaphosphoric acid for reaction with the tetracycline antibiotic should take place under substantially anhydrous conditions to avoid formation of other products and the reaction with the tetracycline should take place as promptly as possible. Any non-aqueous organic liquid which is non-reactive with tetracycline and metaphosphoric acid is suitable as a reaction medium. Among specific organic solvents that may be used in this reaction are dichloroethylene, trichloroethane, dimethylformamide, ethyl acetate, dimethylsulfoxide, tetrahydrofurane, acetone, ethylene glycol (and higher glycols, and glycol ethers), alcohols (e.g., methanol and ethanol), and mixtures of alcohols with the other solvents.

As will be seen from the specific examples which follow, it is preferred but not necessary that the reactants be completely dissolved. Therefore, when the $HPO_3$ is formed in a solvent such as chloroform in which the reactants are not entirely soluble, it is advantageous to add a quantity of another solvent such as methanol so that the reactants may be completely dissolved.

Polyphosphoric acids and metaphoric acid prepared by dehydration of orthophosphoric acid may be used under the same conditions as the metaphosphoric acid to produce the complexes of the present invention.

In the case of the metaphosphoric acid complexes it will be seen from the specific examples, the tetracycline may be added to the solution containing the metaphosphoric acid or, preferably, the metaphosphoric acid solution may be added slowly with stirring to a solution or suspension of the tetracycline antibiotic in an organic liquid.

It is preferred that the reaction take place at a relatively low temperature to avoid formation of metaphosphoric acid polymers before it has had an opportunity to react with the tetracycline. Temperatures of from about 0° C. to 15° C. are considered preferable, but higher temperatures up to 35° C. can be employed under carefully controlled conditions. The reaction mixture is agitated during the course of reaction, which time may vary considerably depending upon a number of factors including the temperature, the volume of the reaction mixture and the design of the reaction kettle. These matters are, however, within the skill of the workmen in the art; and no difficulty will be experienced in arriving at optimum reaction conditions under a variety of circumstances.

The tetracycline-metaphosphoric acid reaction product may be recovered from the reaction mixture in a number of different ways, as will be apparent from the examples. The product may be recovered by simple evaporation of the solvent, preferably at reduced pressure and at low temperatures. Alternatively, the product may be recovered by precipitation from the organic solution by altering the solvent system, as for instance by the addition of another organic solvent which produces a system in which the product is less soluble. Since various ways of recovering the product are available and as this is not a critical part of the invention, further elaboration would seem to be unnecessary.

The product may be used directly as obtained from the reaction mixture after evaporation of the solvent and drying to obtain a powder which may be incorporated in capsules or made into tablets, solutions, elixirs, syrups or other desired form of medication. The amount of the tetracycline-metaphosphoric acid complex to be administered to the patient will be determined, of course, by the attending physician. Although oral administration of the tetracycline-metaphosphate complex results in higher blood levels of tetracycline in a shorter period of time and these higher blood levels will persist over a longer period of time—up to 24 hours in some cases—the actual administration of the tetracycline antibiotic should be the same as would be the case when using tetracycline hydrochloride or other therapeutic form of tetracycline, account being taken, of course, of the actual tetracycline present in the medication. The same considerations apply with respect to the metaphosphoric acid complex of tetracycline, chlortetracycline, oxytetracycline, bromtetracycline and therapeutically effective tetracyclines having 6-hydroxy and 4-dimethylamino groups. An average therapeutic oral dose of any of these tetracycline-metaphosphate products would normally contain about 250 milligrams of the tetracycline calculated as such and would be administered about four times per day.

EXAMPLE I

In a 500-milliliter round-bottomed flask equipped with stirrer, condenser, and thermometer was placed 7.1 grams (0.05 mol) $P_2O_5$ which was immediately covered with 100 milliliters of chloroform. To the mixture was added with stirring 0.9 milliliter (0.05 mol) of distilled water. In a few minutes, a lower oily layer appeared, which was believed to be freshly formed metaphosphoric acid resulting from the action of the $P_2O_5$ with an equimolar amount of water. To this mixture was added 100 milliliters of methanol and on continued stirring, the lower oily layer disappeared in the methanol forming a complete pale yellowish-green colored solution.

An additional 50 milliliters of methanol was added to the flask and then 22.2 grams (0.05 mol) of tetracycline, neutral form, was added portion-wise intermittently with another 50 milliliters of methanol. A clear solution was maintained throughout the addition of the tetracycline. After addition of all of the tetracycline, the solution was a deep orange color and the temperature in the reaction flask was 35° C.

One hour after addition of the tetracycline, the clear reaction solution was poured into 1500 milliliters of chloroform. A yellow product separated and was collected on a coarse sintered glass filter and air dried. The tetracycline-metaphosphoric acid complex weighed about 10 grams, contained 7.34 percent of phosphorus and had a bioassay of 634 gammas per milligram. Solubility in water is 750 mg. per ml.

EXAMPLE II

Into a three-necked, round-bottomed flask equipped with stirrer, thermometer and reflux condenser was placed 7.2 grams $P_2O_5$ which was immediately covered with 100 milliliters chloroform. To this was slowly added with stirring 0.9 milliliter of distilled water. In a few minutes, a small gummy precipitate was formed. This mixture was permitted to stand about one hour to permit the metaphosphoric acid ample time to form. There was then added 100 milliliters of ethanol and on continued stirring the lower pasty layer slowly dissolved.

To the contents of the flask was added, while stirring, 22.2 grams of tetracycline, neutral form, and an additional 50 milliliters of ethanol. The stirring was continued for about one to one and a half hours to effect development of the tetracycline metaphosphate complex. The reaction mixture was then filtered to remove the insoluble yellow material which had formed. The filter cake was reslurried with two 200-milliliter portions of isopropanol, refiltered and air dried. The product weighing 11.3 grams had a melting point between 186–205° C. and a chemical assay of tetracycline of 690 gammas per milligram. Two analyses for phosphorus averaged 8.30 percent phosphorus.

A second crop of the tetracycline-phosphate complex weighing 4.5 grams was obtained by adding another 200 milliliters of isopropanol to the filtrate. This product had a bioassay for tetracycline of 765 gammas per milligram.

On standing overnight, the filtrate deposited a third crop of the product. The water solubility of the product is about 750 mg. per ml.

EXAMPLE III

Four grams of $P_2O_5$ was suspended in 100 milliliters of chloroform and 0.5 gram of distilled water was added to the suspension while stirring and chilling at about 5–10° C. in apparatus as in the preceding examples. After stirring for about one-half hour to permit formation of metaphosphoric acid, 50 milliliters of methanol was added to the mixture. The temperature was maintained within the range of about 5–15° C. Most of the metaphosphoric acid dissolved. To the stirred solution was added at about 15–20° C., 22.2 grams tetracycline, neutral form, an additional 50 milliliters of methanol being concurrently added in small portions. The total mixture was then stirred for one to one and one half hours at 20–25° C. The reaction mixture was filtered and the filter cake was reslurried with two 250-milliliter portions of isopropanol. The filtrate was then added to the isopropanol washes and mixed with another 500 milliliters of isopropanol. The light yellow product, tetracycline-metaphosphate complex, was filtered off and dried. The product contained 6.19 percent phosphorus and had a bioassay of 824 gammas per milligram as tetracycline hydrochloride. The phosphorus analysis indicated a product comprising 1 mol of tetracycline and 1 mol of metaphosphoric acid. Solubility in water is about 500 mg. per ml.

EXAMPLE IV

To minimize oil formation during the reaction period and polymerization side reactions which are obtained in varying degrees when forming the product by the procedure described in the previous examples, the metaphosphoric acid-chloroform-methanol mixture was added to a methanolic suspension of tetracycline, neutral form. In one such preparation, a reaction mixture comprising 57.6 grams $P_2O_5$ with 7.2 milliliters of water dissolved in 600 milliliters of chloroform and 500–600 milliliters of methanol was added slowly to a solution of 300–400 milliliters of methanol containing in suspension 177.6 grams of tetracycline, neutral form. The whole mixture was stirred for one hour at a temperature below 15° C. and eventually an almost complete solution was obtained. The reaction mixture was filtered and the filtrate poured into 8 liters of isopropanol. A light yellow colored tetracycline-metaphosphate complex was precipitated. The solution was allowed to age for about one hour, and the product was recovered by filtration and dried. On analysis, it was found to contain 7.75 percent of phosphorus and had a bioassay of 718 gammas per milligram as tetracycline hydrochloride.

This specific embodiment of the invention may be considered to be the best mode of carrying out the invention contemplated at the present time. Solubility in water is about 750 mg. per ml.

EXAMPLE V

A sample of the tetracycline-metaphosphate complex prepared in accordance with the procedures of the preceding examples and having a bioassay of 775 gammas per milligram as tetracycline hydrochloride and 8.85 percent phosphorus was purified in the following manner. Five grams of the product was dissolved in 25 milliliters of methanol and the solution was filtered to remove a small quantity of insoluble material. To this clear filtrate was added a mixture of 25 milliliters of anhydrous methanol and 75 milliliters of isopropanol. A yellow product separated and was recovered by filtration. It was reslurried and washed with 25 milliliters of isopropanol and air dried. The reworked material had a bioassay of 865 gammas per milligram as tetracycline hydrochloride, contained 7.25 percent phosphorus and melted with decomposition in the range of about 165–200° C. Solubility in water is the same as in Example IV.

EXAMPLE VI

A sample of tetracycline-metaphosphate having a bioassay of 718 gammas per milligram of tetracycline hydrochloride was dissolved in 25 milliliters of distilled water. To this solution was added ten volumes of isopropanol which caused the separation of yellow tetracycline-metaphosphate. The product was filtered and dried and on a bioassay was found to have a potency of 823 gammas per milligram as tetracycline hydrochloride. Solubility in water is about 750 mg. per ml.

EXAMPLE VII

A chlortetracyline-metaphosphate complex was prepared by the procedure similar to that described in the earlier examples. 7.2 grams of $P_2O_5$ was reacted with 0.9 gram of water under 100 milliliters of chloroform and dissolved with the aid of 100 milliliters of methanol. 23.9 grams of chlortetracycline free base was slowly added to the freshly formed metaphosphoric acid and the reaction mixture was stirred for one hour while maintaining the temperature of the solution below about 25° C. The reaction mixture was filtered to remove a few insoluble particles. When the filtrate was poured into a large volume of isopropanol, a yellow powder (chlortetracycline-metaphosphate) precipitated. This was recovered by filtration and dried. The product contained 7.67 percent phosphorus and had a bioassay of 77.6 percent when compared with chlortetracycline hydrochloride. Solubility in water is about 1000 mg. per ml.

EXAMPLE VIII

Efforts were made to prepare the tetracycline-metaphosphate complex of the earlier examples in aqueous solution. Tetracycline hydrochloride (4.8 grams) was dissolved in 50 milliliters of distilled water. A second solution was prepared by dissolving 1 gram of sodium metaphosphate in 50 milliliters of water. To this solution was added 1 milliliter of concentrated hydrochloric acid effecting a pH of less than 1. The tetracycline solution was then added to the aqueous solution containing metaphosphoric acid. The mixed solutions had a pH of about 1 and was clear. On adding additional sodium metaphosphate (1 gram in 50 milliliters of distilled water), the pH was raised to 1.8–1.9 and a yellow solid separated. After stirring for a period of 30 minutes, the reaction mixture was filtered and the product washed with two 25-milliliter portions of isopropanol and air dried. This product had a bioassay of 709 gammas per milligram as tetracycline hydrochloride and a phosphorus content of 12.7 percent.

This product was distinctly different from the products of the preceding examples in that it was soluble in water only to the extent of about 2 to 3 milligrams per milliliter, the solution having a pH of about 3.3. Other products containing less phosphorus were prepared by the same method by the use of smaller amounts of sodium metaphosphate, and all such products had a very low solubility in water.

EXAMPLE IX

Tetracycline, free base, was reacted with orthophosphoric acid and products obtained in accordance with the following procedure.

Tetracycline, neutral (4.44 grams, 0.01 mol), was suspended in 100 milliliters of methanol. To this suspension was added 0.7 milliliter of 85 percent orthophosphoric acid (equivalent to about 1.15 grams, 0.01 mol of $H_3PO_4$). After stirring a completely clear solution formed. An excess (five volumes, 500 cc.) of isopropanol was now added to the solution causing the precipitation of a yellow solid "phosphate." After permitting the mixture to stand one hour, it was filtered in a sintered glass funnel and the precipitate was washed with ca 25 cc. of fresh isopropanol. The product was air dried and finally dried in the vacuum oven over $P_2O_5$. The phosphate gave the following analysis: Bioassay, 747 gammas per milligram as tetracycline hydrochloride (theory, 905 gammas per milligram); percent phosphorus, 4.97 percent (theory 5.8 percent); and percent moisture, 2.14 percent. This product had a solubility in water of less than 1 milligram per milliliter.

EXAMPLE X

This example illustrates the preparation of a chlortetracycline-metaphosphate complex in which one molar part of chlortetracycline is reacted with four molar parts of metaphosphoric acid. 115.2 grams of phosphorus pentoxide and 14.4 milliliters of distilled water were carefully added separately to 600 milliliters of chloroform, the reaction vessel being kept in an ice bath. The cooled solution was stirred for 13 minutes and then 600 milliliters of methanol was added and the stirring continued until the lower pasty layer was dissolved. One half of the phosphorylating solution was slowly added to 95.6 grams of chlortetracycline, neutral, suspended in 300 milliliters of methanol. After about fifteen minutes of stirring, the solution became clear. The ice bath was removed and the solution was then stirred for about one hour. After the reaction mixture had warmed to room temperature, it was filtered and the filtrate so obtained was poured into 4000 milliliters of isopropanol and then placed in a chill room overnight. The product was filtered, washed with 100 milliliters of isopropanol, air dried, and finally dried in a vacuum oven over phosphorus pentoxide.

A yield of 101.9 grams of chlortetracycline metaphosphate was obtained. This product had a bioassay of 783 gammas per milligram, reported as chlortetracycline hydrochloride, 6.8 percent by weight of phosphorus and had a water-solubility of about 667 milligrams per milliliter.

EXAMPLE XI

A chlortetracycline-metaphosphate complex was prepared by a process similar to that of Example X except that three molar quivalents of metaphosphoric acid were reacted with one molar equivalent of chlortetracycline.

The produce has a bioassay of 755 gammas per milligram, calculated as chlortetracycline hydrochloride, a phosphorus content of 8.12 percent, and a water-solubility of about 1.67 grams per milliliter.

EXAMPLE XII

A tetracycline-metaphosphate complex was prepared using four molar parts of freshly prepared metaphosphoric acid and one equivalent of tetracycline. To 88.6 grams of neutral tetracycline suspended in 300 milliliters of methanol was added half of the phosphorylating agent of Example X which had been divided. The reaction vessel was chilled in an ice bath. The reaction mixture became clear in a few minutes; and after about twenty minutes of stirring, the ice bath was removed and stirring was continued for one hour until the solution had warmed to room temperature. The solution was then filtered and there was added 4 liters of isopropanol which caused precipitation of the tetracycline-metaphosphate complex. After chilling the mixture overnight at 0 to 5° C., it was filtered, the product washed with 100 milliliters of isopropanol and dried. Upon analysis, it was found to contain 7.16 percent of phosphorus and had a water-solubility between 600 and 1000 milligrams per milliliter.

EXAMPLE XIII

A tetracycline-metaphosphate complex was prepared by the reaction of one molar part of tetracycline with three molar parts of freshly formed metaphosphoric acid as in the preceding example. This product which contained 8.6 percent of phosphorus had a water-solubility of between 1 and 1.67 grams per milliliter.

EXAMPLE XIV 3.6 grams of phosphorus pentoxide was suspended in 50 milliliters of chloroform and 0.45 gram of distilled water was added slowly with stirring to the mixture at a temperature between 5 and 10° C. Fifty milliliters of methanol was then added and stirring continued until a clear solution resulted. The mixture was permitted to warm to room temperature as 11.5 grams of oxytetracycline neutral was slowly added. The oxytetracycline slowly dissolved in the phosphorylating agent; and as the mixture came to room temperature, a clear solution was formed. This solution was then filtered to remove a small amount of insoluble material and the filtrate was treated with 500 milliliters of isopropanol which precipitated the oxytetracycline-metaphosphate complex product. After aging for two hours, the precipitate was recovered by filtration and washed with 200 milliliters of isopropanol and then air dried. A product having an average assay of 791 gammas per milligram reported as oxytetracycline hydrochloride was obtained and analyzed 5.73 percent phosphorus and had a water-solubility within the range of 600 to 1000 milligrams per milliliter.

EXAMPLE XV

An oxytetracycline-metaphosphate complex prepared in the manner similar to the preceding example using one molar part of oxytetracycline and one molar part of freshly prepared metaphosphoric acid was prepared. This product had a bioassay of 820 gammas per milligram, calculated as oxytetracycline hydrochloride, and contained 4.79 percent phosphorus. It had a water-solubility between 600 and 1000 milligrams per milliliter.

EXAMPLE XVI

*The Preparation of 6-Deoxytetracycline Phosphate Complex*

| | | |
|---|---|---|
| 6-deoxytetracycline neutral (.0012 mole) | mg | 515 |
| $P_2O_5$ (.0018 mole) | mg | 259 |
| Distilled water (.0012 mole) | ml | .0218 |
| Chloroform | ml | 1.8 |
| Methanol (anhydrous) | ml | 2.6 |
| Isopropanol | ml | 20 |

Procedure: The initial steps of this reaction were run in an ice bath at 15° C. or less.

The $P_2O_5$ was suspended with agitation in the chloroform and the water added. After fifteen minutes 1.8 ml. of the methanol was added and agitation continued until complete solution was obtained.

The deoxytetracycline was suspended in 1.8 ml. of methanol and the phosphorylating solution slowly added with agitation. The reaction mixture was then let stand until clear. During this time it was allowed to slowly warm towards room temperature. The clear reaction mixture was poured into the isopropanol. The resulting yellow precipitate was collected, washed with isopropanol and dried in vacuo.

The product was analyzed for phosphorus and, by microbiological assay, for active tetracycline content. Figures are as follows:

Phosphorus: 10.1%
6-deoxytetracycline: 438 γ/mg. as tetracycline HCl
Solubility: 1 gm. dissolves in 1.1 ml. $H_2O$ These values indicate that the deoxytetracycline combined with a phosphorus acid equivalent to about two moles of metaphosphoric acid.

EXAMPLE XVII

*The Preparation of 6-Demethylchlortetracycline Phosphate*

| | | |
|---|---|---|
| 6-demethylchlortetracycline neutral (.0101 mole) | gm | 4.7 |
| $P_2O_5$ (.0154 mole) | gm | 2.2 |
| Distilled water (.0154 mole) | ml | 0.28 |
| Chloroform | ml | 10 |
| Methanol | ml | 20 |
| Isopropanol | ml | 100 |

Procedure: The procedure followed was essentially the same as that given for Example XVI.

The product was analyzed for phosphorus and, by microbiological assay, for active tetracycline content. Figures are as follows:

Phosphorus: 11.2%
6-demethylchlortetracycline: 646 γ/mg.
Solubility: 1 gram dissolved in 1 ml. $H_2O$ These values indicate that the demethylchlortetracycline combined with a phosphorus acid equivalent to about 2.4 moles of metaphosphoric acid.

EXAMPLE XVIII

*The Preparation of Tetracycline Phosphate Using Polyphosphoric Acid as the Phosphorylating Agent*

| | | |
|---|---|---|
| Tetracycline neutral | grams | 50.0 |
| Polyphosphoric acid (ortho equiv. 115%) | do | 19.3 |
| Chloroform | ml | 180 |
| Methanol | ml | 330 |
| Isopropanol | ml | 2400 |

Procedure: The procedure was essentially the same as that given for Example XVI.

The product was analyzed for phosphorus and, by microbiological assay, for active tetracycline content. Figures are as follows:

Phosphorus: 8.62%
Tetracycline HCl: 632 γ/mg.
Solubility: 400 mg. dissolves in 1 ml. $H_2O$ These values indicate that the tetracycline combined with a phosphorus acid equivalent to about 1.6 moles of metaphosphoric acid.

EXAMPLE XIX

*The Preparation of Tetracycline Phosphate Using Dehydrated Orthophosphoric Acid as the Phosphorylating Agent*

| | | |
|---|---|---|
| Tetracycline neutral | gm | 44.4 |
| Metaphosphoric acid | gm | 16.0 |
| Chloroform | ml | 150 |
| Methanol | ml | 250 |
| Isopropanol | ml | 2000 |

Procedure: The metaphosphoric acid is prepared by heating orthophosphoric acid until boiling stops and the solution turns turbid. The reaction procedure is essentially the same as that used in Example XVI.

The product was analyzed for phosphorus and, by microbiological assay, for active tetracycline content. Figures are as follows:

Phosphorus: 6.75%
Tetracycline HCl: 580 γ/ml.
Solubility: 100 mg. dissolves in 0.1 ml. $H_2O$ These values indicate that the tetracycline combined with a phosphorus acid equivalent to about 1.2 moles of metaphosphoric acid.

EXAMPLE XX

*The Preparation of 6-Demethyltetracycline Phosphate*

| | | |
|---|---|---|
| 6-demethyltetracycline neutral (0.0024 mole) | g | 1.03 |
| $P_2O_5$ (0.0036 mole) | g | 0.518 |
| Distilled water (0.0036 mole) | ml | 0.0654 |
| Chloroform | ml | 3.6 |
| Methanol | ml | 7.2 |
| Isopropanol | ml | 50 |

The initial steps of this reaction were run in an ice bath at 15° C. or less.

The $P_2O_5$ was suspended in the chloroform and the water added. After about 15 minutes of intermittent agitation, 3.6 ml. of methanol was added and agitation continued until a clear solution was obtained. The 6-demethyltetracycline was suspended in 3.6 ml. methanol and the phosphorylating agent slowly added with stirring. After about one hour, the ice bath was removed and the reaction mixture was allowed to warm towards room temperature for two hours with stirring. The essentially clear solution was then filtered and poured into 40 ml. of isopropanol. The resulting yellow precipitate was aged for thirty minutes, collected, washed with isopropanol and dried in vacuo.

The product was analyzed for phosphorus and, by microbiological assay, for active tetracycline content. Figures are as follows:

Demethyltetracycline: 68.6%
Phosphorus: 9.64%
Solubility: 200–500 mg./ml. $H_2O$

EXAMPLE XXI

*The Preparation of 6-Deoxy-6-Demethyltetracycline Phosphate*

| | | |
|---|---|---|
| 6-deoxy-6-demethyltetracycline neutral (0.0015 mole) | mg | 621.6 |
| $P_2O_5$ (0.00225 mole) | mg | 321.7 |
| Distilled water (0.00225 mole) | ml | 0.04 |
| Chloroform | ml | 3 |
| Methanol | ml | 10 |
| Isopropanol | ml | 25 |

The procedure employed was essentially the same as that described in Example XX.

6-deoxy-6-demethyltetracycline: 57.1%
Phosphorus: 9.50%
Solubility: 400–1000 mg./ml. $H_2O$ The following table shows the solubility comparison of a number of the complexes of the present invention compared with simple salts including those prepared as described in the Patent 2,791,609. Where there is no notation the complexes of the present invention are meant and simple electrovalent salts are designated by the term salt. A salt prepared according to the patent referred to above is marked by an asterisk.

TABLE

| Sample | Molar ratio of reactants | Solubility, mg./ml. $H_2O$ |
|---|---|---|
| Tetracycline metaphosphate | 1:2 | 400–1,000 |
| Do | 1:3 | 1,000–1,670 |
| Do | 1:4 | 600–1,000 |
| Tetracycline orthophosphate salt | 1:1 | <1 |
| Tetracycline metaphosphate salt | 1:1 | 2–3 |
| Tetracycline metaphosphate salt* | 1:1 | 5 |
| Tetracycline neutral-sodium metaphosphate mixture | (¹) | <2 |
| Chlortetracycline metaphosphate | 1:2 | 1,000 |
| Do | 1:3 | 1,000–1,670 |
| Do | 1:4 | 600–1,000 |
| Chlortetracycline neutral-sodium metaphosphate mixture | (¹) | <2 |
| 6-demethyltetracycline | 1:3 | 500 |
| 6-demethyltetracycline neutral - sodium metaphosphate mixture | (¹) | <2 |
| 6-demethylchlortetracycline | 1:3 | 1,000 |
| 6-demethylchlortetracycline neutral-sodium metaphosphate mixture | (¹) | <10 |
| Oxytetracycline metaphosphate | 1:1 | 600–1,000 |
| Do | 1:2 | 600–1,000 |
| 6-deoxytetracycline metaphosphate | 1:3 | 900 |
| 6-deoxy-6-demethyltetracycline metaphosphate | 1:3 | 400–1,000 |

¹ Attempts to prepare simple phosphates of chlortetracycline and oxytetracycline according to the patent were unsuccessful.

EXAMPLE XXII

The effectiveness of the new metaphosphate complexes of the present invention in giving high initial blood serum levels of tetracycline which persist over a long period of time was demonstrated in a series of tests in which a tetracycline-metaphosphate product prepared by treating 1 mol of tetracycline neutral with 2 mols of freshly formed $HPO_3$ as described in Example IV was administered to rats by the oral route. Comparisons were made with tetracycline free base, tetracycline hydrochloride and a commercially available tetracycline encapsulated mixture which was composed essentially of 59 percent by weight of tetracycline hydrochloride, 39 percent of dibasic calcium phosphate anhydrous and about 1 percent by weight of each of magnesium stearate and liquid petrolatum which were incorporated as lubricants. Normal healthy adult rats were divided into groups of six each. Each rat was dosed with the equivalent of 50 milligrams per kilogram of body weight of tetracycline calculated as the free base. Blood samples from each rat were obtained after periods of one, four, seven, and twenty-four hours and the tetracycline concentration in the serum was determined in terms of gammas per milliliter calculated as tetracycline hydrochloride. The results are shown in the following table.

TABLE 2

| No. rats | Av. Wt., grams | Preparation administered | Tetracycline concentration in serum γ/ml. | | | |
|---|---|---|---|---|---|---|
| | | | 1 hr. | 4 hr. | 7 hr. | 24 hr. |
| 6 | 381 | Tetracycline metaphosphate anhydrous prep. | 2.9 | 2.3 | 1.0 | 0.16 |
| 6 | 357 | Tetracycline HCl capsuled mix. | 0.8 | 0.6 | 0.3 | 0.006 |
| 6 | 399 | Tetracycline HCl | 2.8 | 1.5 | 0.8 | 0.11 |
| 6 | 313 | Tetracycline, base | 1.8 | 1.1 | 0.6 | 0.08 |

As will be seen, the tetracycline-metaphosphate complex of the present invention gives higher initial blood levels; and these higher levels persist over a longer period of time.

The product of the present invention prepared by reacting $HPO_3$ with tetracycline under anhydrous conditions was also compared with a commercially available complex formed by reacting tetracycline hydrochloride with sodium metaphosphate in aqueous media and also with a product comprising a mixture of tetracycline free base and sodium metaphosphate in ratios of 250:380 by weight. The three products were found to give the same high initial and long-lasting blood levels within experimental error.

The following examples represent various formulations containing the new products of the present invention in such form as make them particularly suitable for special uses.

EXAMPLE XXIII

A pharmaceutical ointment was prepared by melting together at 65° C. 10 kilograms of wool fat U.S.P. and 83.7 grams of white petrolatum U.S.P. To this was added 4.27 kilograms of the tetracycline metaphosphoric acid complex (containing an equivalent of 775 micrograms per milligram as tetracycline hydrochloride) prepared by the method described in Example IV together with 2.4 kilograms of methyl parahydroxybenzoate and 0.6 kilogram of propyl parahydroxybenzoate and the suspension was passed through a Premier Mill set at 0.005 inch. The final mix was pumped into a storage tank and then filled into tubes. Each gram of the ointment contains an equivalent of about 30 milligrams of antibiotic calculated as tetracycline hydrochloride.

EXAMPLE XXIV

Gelatin capsules containing the antibiotic product of the present invention are prepared in the following manner. Three hundred thirty-nine kilograms of the tetracycline metaphosphoric acid complex (containing an equivalent of 775 micrograms per milligram as tetracycline hydrochloride) prepared by the process of Example IV are mixed with 170 kilograms of dibasic calcium phosphate anhydrous in a Day F. Blender for 30 minutes. A 20-kilogram portion of the mixture is transferred to a Stokes B. Mixer and 4.4 kilograms of light liquid petrolatum is added and mixed with the powdered mixture. This mixture is then mixed with a second 20-kilogram portion of the powdered mixture and passed through a Fitzpatrick Comminuting Machine using a No. 2 screen and 5000 revolutions per minute. 4.4 kilograms of powdered magnesium stearate is mixed with a 5-kilogram portion of the mixed powders and is screened through the Fitzpatrick Machine as above. The 40 kilograms of material mixed with the petrolatum is then returned to the Day F. Blender and mixed for fifteen minutes after which the 5-kilogram portion containing the magnesium stearate is added and the mixture again blended for fifteen minutes. The powder is then assayed and filled into gelatin capsules to contain 50, 100, and 250 milligrams of the antibiotic activity calculated as tetracycline hydrochloride.

EXAMPLE XXV

A liquid preparation suitable for oral administration is prepared in the following manner. 0.029 kilogram of imitation cherry flavor, 0.118 kilogram of F.D and C. red dye and 0.059 kilogram of high viscosity 140-mesh algin is mixed with 25 kilograms of sucrose and barrel rolled for one-half hour. The mixture is then screened through a Fitzpatrick Comminuting Machine using a 00 screen at 5000 revolutions per minute. The screened material is put into a Day Mixer and 5.38 kilograms of tetracycline-metaphosphoric acid complex (containing an equivalent of 775 micrograms per milligram as tetracycline hydrochloride) prepared by the process of Example IV is added and the materials mixed for twenty minutes. The blend is then put through the Fitzpatrick Machine using an 00 screen at 5000 revolutions per minute and is then returned to the Day Mixer and blended an additional ten minutes. The powder is then filled into bottles. For use, sufficient water is added to each bottle so that 1 fluid ounce of the liquid preparation will contain about 11.5 grams of the mixture. Each teaspoonful (5 cc.) of this preparation contains an amount of tetracycline activity equivalent to 250 milligrams of tetracycline hydrochloride.

EXAMPLE XXVI

A soluble antibiotic powder particularly suitable for veterinary applications is prepared by premixing 3.9 kilograms of TWEEN 80 with 70 kilograms of powdered sugar in a Stokes C Mixer for twenty minutes. The premix is screened through a Fitzpatrick Comminuting Machine using a No. 2 screen at 5000 revolutions per minute. Ninety kilograms of powdered anhydrous citric acid is then put through a No. 12 hand screen. The citric acid, 43.3 kilograms of tetracycline-metaphosphoric acid complex (containing an equivalent of 765 micrograms per milligram as tetracycline hydrochloride) prepared by the process of Example IV, the Tween-sugar premix, and 346.7 kilograms of powdered sugar were placed in a Day F. Mixer and blended for 45 minutes. The powder is discharged from the blender through a No. 12 hand screen and is packaged in containers suitable for shipping to the user.

EXAMPLE XXVII

A tetracycline antibiotic product suitable for intramuscular injection may be prepared in the following manner: One hundred forty-one milligrams of tetracycline-metaphosphate complex (containing an equivalent of 710 micrograms per milligram as tetracycline hydrochloride) prepared by the process of Example IV is mixed with 250 milligrams of ascorbic acid and 40 milligrams of procaine hydrochloride. The mixed powder is then transferred in trays to a chamber where it is sterilized by exposure to ethylene oxide. The sterile powder is screened aseptically in a Model J Fitzpatrick Machine using a 60-mesh screen at 5000 revolutions per minute. The sterile screened powder is then mixed with 100 milligrams of sterile screened magnesium chloride hexahydrate and the mixture is then ready for sterile filling into suitable vials which are then sealed. The contents of the vial are dissolved in water when needed.

Similar products to those in Examples XXII to XXVII can be prepared by substituting the chlortetracycline-metaphosphate complex or the oxytetracycline-metaphosphate complex prepared under anhydrous conditions as described in the earlier examples for the tetracycline product on an equal weight basis.

This application is in part a continuation of our copending application Serial No. 667,714 filed June 24, 1957, now abandoned.

We claim:

1. A complex of a tetracycline antibiotic and metaphosphoric acid, said tetracycline antibiotic being selected from the group consisting of tetracycline, chlortetracycline, bromtetracycline, oxytetracycline, 6-demethylchlortetracycline, 6-demethyltetracycline, 6-deoxytetracycline, and 6-deoxy-6-demethyltetracycline, said metaphosphoric acid being present in amounts from 1 to 4 moles per mole of antibiotic and said complex having a water solubility of from about 400 to 1,000 milligrams per milliliter.

2. A complex according to claim 1 in which the antibiotic is tetracycline.

3. A complex according to claim 1 in which the antibiotic is 6-demethylchlortetracycline.

4. A complex according to claim 1 in which the antibiotic is chlortetracycline.

5. A complex according to claim 1 in which the antibiotic is 6-demethyltetracycline.

6. A complex according to claim 1 in which the antibiotic is oxytetracycline.

7. A complex according to claim 1 in which the antibiotic is 6-deoxytetracycline.

8. A complex according to claim 1 in which the antibiotic is 6-deoxy-6-demethyltetracycline.

9. A complex according to claim 1 in which the antibiotic is bromtetracycline.

References Cited in the file of this patent

UNITED STATES PATENTS

| | | |
|---|---|---|
| 2,516,080 | Sobin et al. | July 18, 1950 |
| 2,699,054 | Conover | Jan. 11, 1955 |
| 2,739,924 | Lein et al. | Mar. 27, 1956 |
| 2,791,609 | Kaplan | May 7, 1957 |
| 2,795,528 | Buckwalter et al. | June 11, 1957 |
| 2,812,349 | Gordon | Nov. 5, 1957 |
| 2,895,993 | Stephens | July 21, 1959 |

FOREIGN PATENTS

| | | |
|---|---|---|
| 167,750 | Australia | May 6, 1954 |